United States Patent
van Dort

(10) Patent No.: US 12,458,791 B2
(45) Date of Patent: Nov. 4, 2025

(54) HEART ASSIST DEVICE

(71) Applicant: CardiacBooster B.V., Nijmegen (NL)

(72) Inventor: Daniël Immanuel Michaël van Dort, Nijmegen (NL)

(73) Assignee: CardiacBooster B.V., Nijmegen (NL)

( * ) Notice: Subject to any disclaimer, the term of this patent is extended or adjusted under 35 U.S.C. 154(b) by 212 days.

(21) Appl. No.: 17/434,789

(22) PCT Filed: Feb. 28, 2020

(86) PCT No.: PCT/NL2020/050129
§ 371 (c)(1),
(2) Date: Aug. 30, 2021

(87) PCT Pub. No.: WO2020/180176
PCT Pub. Date: Sep. 10, 2020

(65) Prior Publication Data
US 2022/0161017 A1 May 26, 2022

(30) Foreign Application Priority Data

Mar. 1, 2019 (NL) ..................................... 2022660

(51) Int. Cl.
*A61M 60/17* (2021.01)
*A61M 60/268* (2021.01)
(Continued)

(52) U.S. Cl.
CPC .......... *A61M 60/427* (2021.01); *A61M 60/17* (2021.01); *A61M 60/268* (2021.01);
(Continued)

(58) Field of Classification Search
CPC .. A61M 60/247; A61M 60/268; A61M 60/17; A61M 60/865; A61M 2205/0216; A61M 2205/0266
See application file for complete search history.

(56) References Cited

U.S. PATENT DOCUMENTS 3,939,820 A 2/1976 Grayzel
4,154,227 A 5/1979 Krause et al.
(Continued)

FOREIGN PATENT DOCUMENTS

CN 1946449 A 4/2007
CN 101124002 A 2/2008
(Continued)

OTHER PUBLICATIONS

International Search Report and Written Opinion mailed Jan. 31, 2022, International Application No. PCT/NL2021/050621, 9 pages.
(Continued)

*Primary Examiner* — Jennifer Pitrak McDonald
*Assistant Examiner* — Jennifer L Ghand
(74) *Attorney, Agent, or Firm* — FORTEM IP LLP

(57) ABSTRACT

A device (2) for providing circulatory assistance is provided and comprises a balloon (4) comprising a membrane defining a cavity having an internal volume (Vc), wherein the balloon comprises a proximal portion (4a) comprising a proximal end and a distal portion (4b) comprising a distal end. The device (2) further comprises a first catheter, affixed to the distal end of the balloon (4) at a first fixation point (P1) and a second catheter (8), affixed to the proximal end of the balloon at a second fixation point (P2). The second catheter (8) is configured for axial movement with respect to the first catheter or guide wire (6) between a first position in which the first and second fixation points (P1, P2) are spaced apart from each other in the longitudinal direction by a first distance (Dx), which is variable to bring about inversion of the balloon.

11 Claims, 5 Drawing Sheets

(51) Int. Cl.
*A61M 60/295* (2021.01)
*A61M 60/427* (2021.01)
*A61M 60/843* (2021.01)
*A61M 60/865* (2021.01)

(52) U.S. Cl.
CPC ........ *A61M 60/295* (2021.01); *A61M 60/843* (2021.01); *A61M 60/865* (2021.01); *A61M 2205/0216* (2013.01); *A61M 2205/0266* (2013.01)

(56) References Cited

U.S. PATENT DOCUMENTS

| | | |
|---|---|---|
| 4,785,795 A | 11/1988 | Singh |
| 4,861,330 A | 8/1989 | Voss |
| 4,902,272 A | 2/1990 | Milder et al. |
| 4,902,291 A | 2/1990 | Kolff |
| 4,906,229 A | 3/1990 | Wampler |
| 4,946,440 A * | 8/1990 | Hall .................. A61M 16/0833 606/7 |
| 4,964,864 A | 10/1990 | Summers et al. |
| 5,139,517 A | 8/1992 | Corral |
| 5,169,378 A | 12/1992 | Figuera |
| 5,192,314 A | 3/1993 | Daskalakis |
| 5,484,385 A | 1/1996 | Rishton |
| 5,749,855 A | 5/1998 | Reitan |
| 5,820,542 A | 10/1998 | Dobak et al. |
| 5,827,171 A | 10/1998 | Dobak et al. |
| 5,928,132 A | 7/1999 | Leschinsky |
| 6,106,497 A | 8/2000 | Wang |
| 6,200,260 B1 | 3/2001 | Bolling |
| 6,210,318 B1 | 4/2001 | Lederman |
| 6,299,575 B1 | 10/2001 | Bolling |
| 6,387,037 B1 | 5/2002 | Bolling et al. |
| 6,390,969 B1 | 5/2002 | Bolling et al. |
| 6,406,422 B1 | 6/2002 | Landesberg |
| 6,428,464 B1 | 8/2002 | Bolling |
| 6,508,777 B1 | 1/2003 | Macoviak et al. |
| 6,508,787 B2 | 1/2003 | Erbel et al. |
| 6,610,004 B2 | 8/2003 | Viole et al. |
| 6,669,624 B2 | 12/2003 | Frazier |
| 6,685,621 B2 | 2/2004 | Bolling et al. |
| 6,808,483 B1 | 10/2004 | Ortiz et al. |
| 6,889,082 B2 | 5/2005 | Bolling et al. |
| 6,959,711 B2 | 11/2005 | Murphy et al. |
| 6,994,093 B2 | 2/2006 | Murphy et al. |
| 7,125,376 B2 | 10/2006 | Viole et al. |
| 7,144,365 B2 | 12/2006 | Bolling et al. |
| 7,144,407 B1 | 12/2006 | Lasersohn |
| 7,331,921 B2 | 2/2008 | Viole et al. |
| 7,374,531 B1 | 5/2008 | Kantrowitz |
| 7,458,929 B2 | 12/2008 | Bolling et al. |
| 7,468,050 B1 | 12/2008 | Kantrowitz |
| 7,513,863 B2 | 4/2009 | Bolling et al. |
| 7,588,531 B2 | 9/2009 | Bolling |
| 7,591,778 B2 | 9/2009 | Bolling |
| 7,614,997 B2 | 11/2009 | Bolling |
| 7,655,005 B2 | 2/2010 | Bhola |
| 7,691,047 B2 | 4/2010 | Ferrari |
| 7,879,003 B2 | 2/2011 | Bertolero et al. |
| 7,914,436 B1 | 3/2011 | Kung |
| 7,955,248 B2 | 6/2011 | Miller |
| 7,976,452 B2 | 7/2011 | Kantrowitz |
| 7,993,260 B2 | 8/2011 | Bolling |
| 8,016,739 B2 | 9/2011 | Peters et al. |
| 8,121,684 B2 | 2/2012 | Ross et al. |
| 8,206,278 B2 | 6/2012 | De et al. |
| 8,216,122 B2 | 7/2012 | Kung |
| 8,409,128 B2 | 4/2013 | Ferrari |
| 8,449,443 B2 | 5/2013 | Rodefeld et al. |
| 8,469,873 B2 | 6/2013 | Miller et al. |
| 8,480,555 B2 | 7/2013 | Kung |
| 8,545,382 B2 | 10/2013 | Suzuki et al. |
| 8,571,658 B2 | 10/2013 | Peters et al. |
| 8,579,858 B2 | 11/2013 | Reitan et al. |
| 8,591,394 B2 | 11/2013 | Peters et al. |
| 8,628,571 B1 | 1/2014 | Hacohen et al. |
| 8,702,583 B2 | 4/2014 | Miller |
| 8,727,959 B2 | 5/2014 | Reitan et al. |
| 8,900,115 B2 | 12/2014 | Bolling et al. |
| 8,932,246 B2 | 1/2015 | Ferrari |
| 9,119,908 B2 | 9/2015 | Peters et al. |
| 9,308,302 B2 | 4/2016 | Zeng |
| 9,327,067 B2 | 5/2016 | Zeng et al. |
| 9,358,329 B2 | 6/2016 | Fitzgerald et al. |
| 9,358,330 B2 | 6/2016 | Schumacher |
| 9,364,592 B2 | 6/2016 | Mcbride et al. |
| 9,364,593 B2 | 6/2016 | Mcbride et al. |
| 9,433,715 B2 | 9/2016 | Kantrowitz et al. |
| 9,446,179 B2 | 9/2016 | Keenan et al. |
| 9,545,468 B2 | 1/2017 | Aboul-Hosn et al. |
| 9,555,176 B2 | 1/2017 | Peters et al. |
| 9,561,314 B2 | 2/2017 | Aboul-Hosn et al. |
| 9,561,375 B2 | 2/2017 | Peters et al. |
| 9,597,437 B2 | 3/2017 | Aboul-Hosn et al. |
| 9,611,743 B2 | 4/2017 | Toellner et al. |
| 9,623,163 B1 | 4/2017 | Fischi |
| 9,675,738 B2 | 6/2017 | Tanner et al. |
| 9,675,739 B2 | 6/2017 | Tanner et al. |
| 9,675,740 B2 | 6/2017 | Zeng et al. |
| 9,717,833 B2 | 8/2017 | Mcbride et al. |
| 9,744,281 B2 | 8/2017 | Siegenthaler |
| 9,770,543 B2 | 9/2017 | Tanner et al. |
| 9,771,801 B2 | 9/2017 | Schumacher et al. |
| 9,789,238 B2 | 10/2017 | Aboul-Hosn et al. |
| 9,827,356 B2 | 11/2017 | Muller et al. |
| 9,833,550 B2 | 12/2017 | Siess |
| 9,872,947 B2 | 1/2018 | Keenan et al. |
| 9,872,948 B2 | 1/2018 | Siess |
| 9,878,079 B2 | 1/2018 | Pfeffer et al. |
| 9,889,242 B2 | 2/2018 | Pfeffer et al. |
| 9,907,890 B2 | 3/2018 | Muller |
| 9,919,087 B2 | 3/2018 | Pfeffer et al. |
| 9,962,475 B2 | 5/2018 | Campbell et al. |
| 9,987,404 B2 | 6/2018 | Tanner et al. |
| 10,029,037 B2 | 7/2018 | Muller et al. |
| 10,039,872 B2 | 8/2018 | Zeng et al. |
| 10,039,873 B2 | 8/2018 | Siegenthaler |
| 10,071,192 B2 | 9/2018 | Zeng |
| 10,080,871 B2 | 9/2018 | Schumacher et al. |
| 10,086,121 B2 | 10/2018 | Fitzgerald et al. |
| 10,098,992 B2 | 10/2018 | Van Dort et al. |
| 10,105,475 B2 | 10/2018 | Muller |
| 10,107,299 B2 | 10/2018 | Scheckel |
| 10,117,980 B2 | 11/2018 | Keenan et al. |
| 10,117,982 B2 | 11/2018 | Curtis |
| 10,137,231 B2 | 11/2018 | Anagnostopoulos |
| 10,149,932 B2 | 12/2018 | Mcbride et al. |
| 10,238,783 B2 | 3/2019 | Aboul-Hosn et al. |
| 10,279,095 B2 | 5/2019 | Aboul-Hosn et al. |
| 10,300,185 B2 | 5/2019 | Aboul-Hosn et al. |
| 10,300,186 B2 | 5/2019 | Aboul-Hosn et al. |
| 10,322,218 B2 | 6/2019 | Aboul-Hosn et al. |
| 10,328,191 B2 | 6/2019 | Aboul-Hosn et al. |
| 10,357,598 B2 | 7/2019 | Aboul-Hosn et al. |
| 10,449,276 B2 | 10/2019 | Pfeffer et al. |
| 10,449,279 B2 | 10/2019 | Muller |
| 10,456,514 B2 | 10/2019 | Adlam et al. |
| 10,478,539 B2 | 11/2019 | Pfeffer et al. |
| 10,512,714 B2 | 12/2019 | Pfeifer et al. |
| 10,525,178 B2 | 1/2020 | Zeng |
| 10,525,238 B2 | 1/2020 | Schumacher et al. |
| 10,561,773 B2 | 2/2020 | Ferrari et al. |
| 10,576,192 B2 | 3/2020 | Muller et al. |
| 10,576,193 B2 | 3/2020 | Tanner et al. |
| 10,583,232 B2 | 3/2020 | Muller |
| 10,584,589 B2 | 3/2020 | Schumacher et al. |
| 10,709,828 B2 | 7/2020 | Toellner et al. |
| 10,709,829 B2 | 7/2020 | Muller |
| 10,709,830 B2 | 7/2020 | Tanner et al. |
| 10,737,005 B2 | 8/2020 | Tanner et al. |
| 10,765,789 B2 | 9/2020 | Zeng et al. |
| 10,786,610 B2 | 9/2020 | Zeng |
| 10,799,624 B2 | 10/2020 | Pfeffer et al. |

(56) References Cited

U.S. PATENT DOCUMENTS

| | | | |
|---|---|---|---|
| 10,864,308 B2 | 12/2020 | Muller et al. | |
| 10,864,309 B2 | 12/2020 | Mcbride et al. | |
| 10,874,781 B2 | 12/2020 | Toellner | |
| 10,874,783 B2 | 12/2020 | Pfeffer et al. | |
| 10,881,770 B2 | 1/2021 | Tuval et al. | |
| 10,881,836 B2 | 1/2021 | Schumacher et al. | |
| 10,894,115 B2 | 1/2021 | Pfeffer et al. | |
| 10,898,625 B2 | 1/2021 | Toellner | |
| 10,898,626 B2 | 1/2021 | Siegenthaler | |
| 10,920,596 B2 | 2/2021 | Toellner et al. | |
| 10,960,116 B2 | 3/2021 | Campbell et al. | |
| 10,980,927 B2 | 4/2021 | Pfeffer et al. | |
| 10,994,120 B2 | 5/2021 | Tuval et al. | |
| 11,045,638 B2 | 6/2021 | Keenan et al. | |
| 11,058,865 B2 | 7/2021 | Fitzgerald et al. | |
| 11,077,294 B2 | 8/2021 | Keenan et al. | |
| 11,123,539 B2 | 9/2021 | Pfeffer et al. | |
| 11,129,978 B2 | 9/2021 | Pfeffer et al. | |
| 11,135,405 B2 | 10/2021 | Schumacher et al. | |
| 11,160,970 B2 | 11/2021 | Muller et al. | |
| 11,167,124 B2 | 11/2021 | Pfeffer et al. | |
| 11,173,297 B2 | 11/2021 | Muller | |
| 11,285,309 B2 | 3/2022 | Tuval et al. | |
| 11,318,017 B2 | 5/2022 | Besselink | |
| 11,351,355 B2 | 6/2022 | Walters et al. | |
| 11,400,274 B2 | 8/2022 | Van Dort | |
| 11,534,304 B2 | 12/2022 | Thornton et al. | |
| 11,583,670 B2 | 2/2023 | Pfeifer et al. | |
| 11,602,628 B2 | 3/2023 | Anagnostopoulos | |
| 12,246,171 B2 | 3/2025 | Van Dort et al. | |
| 2002/0133227 A1 | 9/2002 | Murphy et al. | |
| 2002/0173693 A1 | 11/2002 | Landesberg | |
| 2003/0050659 A1 | 3/2003 | Murphy et al. | |
| 2003/0074051 A1 | 4/2003 | Freislinger | |
| 2004/0097783 A1 | 5/2004 | Peters et al. | |
| 2005/0171527 A1 | 8/2005 | Bhola | |
| 2005/0228211 A1 | 10/2005 | Leasure | |
| 2006/0008497 A1 | 1/2006 | Gabbay | |
| 2007/0004960 A1 | 1/2007 | Azzolina | |
| 2009/0259089 A1 | 10/2009 | Gelbart et al. | |
| 2011/0106120 A1 | 5/2011 | Haselby et al. | |
| 2011/0218382 A1 | 9/2011 | Orejola | |
| 2011/0270331 A1 | 11/2011 | Peters et al. | |
| 2013/0184515 A1 | 7/2013 | Ovyl et al. | |
| 2014/0039536 A1* | 2/2014 | Cully | A61B 17/12136 606/213 |
| 2015/0306291 A1 | 10/2015 | Bonde et al. | |
| 2016/0015877 A1 | 1/2016 | Guerrero et al. | |
| 2016/0089482 A1 | 3/2016 | Siegenthaler | |
| 2016/0143739 A1 | 5/2016 | Horgan et al. | |
| 2017/0056574 A1 | 3/2017 | Pfeifer et al. | |
| 2017/0136162 A1* | 5/2017 | van Dort | A61M 60/295 |
| 2017/0173237 A1 | 6/2017 | Pfeifer et al. | |
| 2018/0055981 A1 | 3/2018 | Smith et al. | |
| 2018/0303990 A1 | 10/2018 | Siess et al. | |
| 2018/0338833 A1* | 11/2018 | Wilson | A61B 17/12122 |
| 2019/0083689 A1 | 3/2019 | Anagnostopoulos | |
| 2019/0117865 A1 | 4/2019 | Walters et al. | |
| 2020/0030510 A1 | 1/2020 | Higgins | |
| 2020/0121838 A1 | 4/2020 | Pfeifer et al. | |
| 2020/0246527 A1 | 8/2020 | Hildebrand et al. | |
| 2020/0268953 A1 | 8/2020 | Ferrari et al. | |
| 2020/0376179 A1 | 12/2020 | Patzer et al. | |
| 2021/0113826 A1 | 4/2021 | Smith et al. | |
| 2021/0138129 A1 | 5/2021 | Yang et al. | |
| 2021/0187274 A1 | 6/2021 | Malkin et al. | |
| 2021/0244935 A1 | 8/2021 | Van Dort | |
| 2021/0379354 A1 | 12/2021 | Tansley et al. | |
| 2022/0032033 A1 | 2/2022 | Besselink et al. | |
| 2022/0134081 A1* | 5/2022 | van Dort | A61M 60/837 623/3.1 |
| 2022/0161017 A1* | 5/2022 | van Dort | A61M 60/17 |
| 2022/0347460 A1 | 11/2022 | Van Dort | |
| 2024/0072576 A1 | 2/2024 | Melone | |
| 2024/0075276 A1 | 3/2024 | Van Dort et al. | |
| 2025/0025677 A1 | 1/2025 | Van Dort et al. | |
| 2025/0177722 A1 | 6/2025 | Van Dort et al. | |

FOREIGN PATENT DOCUMENTS

| | | |
|---|---|---|
| CN | 106573090 A | 4/2017 |
| DE | 202007019486 U1 | 12/2012 |
| DE | 102017103350 A1 | 8/2017 |
| EP | 1017430 A1 | 7/2000 |
| EP | 2752209 A1 | 7/2014 |
| EP | 1878453 B1 | 12/2014 |
| EP | 3398626 A1 | 11/2018 |
| EP | 3442614 A1 | 2/2019 |
| EP | 3466458 A1 | 4/2019 |
| EP | 3503939 A1 | 7/2019 |
| EP | 3010563 B1 | 12/2019 |
| EP | 3473279 B1 | 7/2020 |
| EP | 3697464 A2 | 8/2020 |
| EP | 3188769 B1 | 1/2021 |
| EP | 3818997 A1 | 5/2021 |
| EP | 3829670 A1 | 6/2021 |
| EP | 3873555 A1 | 9/2021 |
| WO | 98/18508 | 5/1998 |
| WO | 0029057 A1 | 5/2000 |
| WO | 2005102414 A1 | 11/2005 |
| WO | 2011017440 A2 | 2/2011 |
| WO | 2011117566 A1 | 9/2011 |
| WO | 2014203078 A2 | 12/2014 |
| WO | 2015131879 A1 | 9/2015 |
| WO | 2015184450 A1 | 12/2015 |
| WO | 2016/001218 | 1/2016 |
| WO | 2016/176431 | 11/2016 |
| WO | 2017205909 A1 | 12/2017 |
| WO | 2018075875 A1 | 4/2018 |
| WO | 2018/158635 A1 | 9/2018 |
| WO | 2019/071148 A1 | 4/2019 |
| WO | 2019158420 A9 | 12/2019 |
| WO | 2020022905 A1 | 1/2020 |
| WO | 2020/053663 A1 | 3/2020 |
| WO | 2020180176 A1 | 9/2020 |
| WO | 2020180177 A1 | 9/2020 |
| WO | 2021149090 A3 | 10/2021 |
| WO | 2022081009 A1 | 4/2022 |
| WO | 2022126123 A1 | 6/2022 |
| WO | 2022235152 A1 | 11/2022 |
| WO | 2023194594 A1 | 10/2023 |

OTHER PUBLICATIONS

International Search Report and Written Opinion mailed May 7, 2020, International Application No. PCT/NL2020/050129, 11 pages.
International Search Report and Written Opinion mailed May 7, 2020, International Application No. PCT/NL2020/050130, 10 pages.
International Search Report and Written Opinion mailed Nov. 14, 2019, International Application No. PCT/NL2019/050499, 11 pages.
International Search Report and Written Opinion mailed Sep. 4, 2015, International Application No. PCT/EP2015/064836, 8 pages.
International Search Report and Written Opinion dated Aug. 25, 2022; International Application No. PCT/NL2022/050193; 20 pages.
Rebholz, Mathias, "High-frequency actuation of pulsatile ventricular assist devices", Doctoral Thesis; Published on Dec. 2019, 157 Pages.
Niu, Yanwen, "Structural Parameters Optimization and Finite Element Analysis of Artificial Heart Pump Impeller", Dissertation for the Master Degree in Engineering, Shenzhen Graduate School, Dec. 2016, 67 pages.
Rüschen, D., et al., "Robust Assistance Control of Left Ventricular Assist Devices", IFMBE Proceedings, vol. 65, Springer Nature Singapore Pte Ltd, 2018, 2 pages.
Yamane, Takashi, et al., "Hemocompatibility of a hydrodynamic levitation centrifugal blood pump", Journal of Artificial Organs, vol. 10, 2007, pp. 71-76.

* cited by examiner

HEART ASSIST DEVICE

CROSS-REFERENCE TO RELATED APPLICATIONS

The present application is a 371 of International Application No. PCT/NL2020/050129, filed Feb. 28, 2020, which claims the benefit of priority to Dutch Patent Application No. 2022660, filed Mar. 1, 2019, now Dutch U.S. Pat. No. 2,022,660, issued Sep. 15, 2020, each of which is incorporated by reference herein in its entirety.

TECHNICAL FIELD

The present invention relates to a device for circulatory assistance, more particularly an intra-lumen (e.g. intra-cardiac or intra-vascular) device for providing circulatory assistance adapted to be positioned within a chamber of the heart.

BACKGROUND OF THE INVENTION

Conditions that affect the ability of the heart to pump blood around the body are a major cause of mortality worldwide. Conditions that compromise or impair the heart's ability to pump blood effectively include cardiovascular diseases related to constriction of blood vessels and conditions that affect the heart wall, thus impacting its capacity to expel blood from the chambers of the heart. Conditions that affect the capacity of the heart wall to expel blood from the heart chambers include chronic heart failure, cardiac shock, or other conditions that cause weakening, distension or scarring of the heart wall. For patients suffering from such conditions, it may be necessary or desirable to provide mechanical circulatory assistance.

Devices for providing circulatory assistance are known in the art. For example, US Patent Publication No. US 2013/184515 describes an intraventricular balloon device comprising a slender flexible catheter with an inflatable balloon provided near the distal end. The balloon can be periodically inflated and deflated and acts as a displacement body within the heart, displacing blood volume as it inflates (during diastole), before deflating (during systole).

International Patent Publication WO 2016/001218 describes a heart support device for circulatory assistance with an internal member configured to be disposed within a heart lumen. The device comprises a dynamic volume body that can be inflated and deflated periodically with the natural (or modified) rhythm of the heart to provide circulatory assistance. The internal member has a substantially stiff wall strengthening portion arranged to engage an inner wall surface of the heart and an inflatable dynamic member that is inflatable to assist pumping action of the heart.

Although the effect of both of these systems is to dispose a residual volume of blood from the heart lumen or chamber, such displacement devices do not provide the efficiency of natural cardiac motion. There is thus a need for an improved circulatory assistance device.

International Patent Publication WO2016/176431 discloses a heart assist device of the type having a jacket to be applied external of the heart, in combination with an aortic compression chamber.

U.S. Pat. No. 4,861,330 discloses a device and method for assisting the pumping action of a failed heart. The device comprises an inelastic balloon, preferably conical in shape, connected to a catheter and pump. The balloon is percutaneously fed into a major blood vessel and then guided to a ventricle of the heart. When placed in the left ventricle, the balloon inflates during the isovolumetric contraction period before the aortic valve opens, and deflates after the aortic valve is closed but before the mitral valve has opened.

International Patent Publication WO98/18508 discloses a circulatory assist device having a housing and a pumping membrane, with a control chamber and a pumping chamber. The device is mounted on a catheter and collapsed to a sufficiently small diameter to allow insertion into the vascular system of a patient. An expansion mechanism in the device, such as a stent, can be expanded to hold the housing in an expanded, substantially rigid state, while control fluid is pumped into and evacuated from the control chamber to repeatedly deflect the pumping membrane. At least one opening is formed in the device, to allow vascular fluid to enter and exit the pumping chamber as the pumping membrane deflects. Introduction and evacuation of control fluid can be synchronized with the heart cycle of the patient. After use, the housing is contracted to a smaller diameter to allow withdrawal from the vascular system.

SUMMARY OF THE INVENTION

The present invention seeks to provide an improved intra-lumen (e.g. intra-cardiac or intra-vascular) heart support device that can be implanted into a heart chamber or blood vessel to provide mechanical assistance for the heart. The present invention comprises an advantageous structure that allows for minimally invasive placement and effective and efficient displacement of blood from an internal volume in a predetermined direction.

The above advantages are provided by a heart assist device that can be deployed to a working configuration within a heart chamber or associated lumen (e.g. a major vessel such as the aorta) in a reliable and minimally invasive manner.

The device generally comprises a balloon that can be partially inverted to form a cup shape that is supported in an open configuration once deployed. Once inverted, a first portion of the balloon is supported in an open configuration to form an outer wall of the cup and an inner portion of the balloon forms an inner wall can be periodically moved towards and away from the outer wall of the cup to provide a pumping action that can offer circulatory assistance when disposed within a heart chamber or lumen.

Advantageously, the present invention comprises a pre-deployment configuration and a post-deployment configuration.

Accordingly, in a first aspect of the invention there is provided a device for providing circulatory assistance (in a pre-deployment configuration), the device comprising a balloon comprising a membrane defining a closed internal cavity. The balloon comprises a proximal portion comprising a proximal end and a distal portion comprising a distal end. A longitudinal axis extends between the proximal and distal ends. A first catheter is affixed to the distal end of the balloon at a first fixation point P1 and a second catheter is affixed to the proximal end of the balloon at a second fixation point P2. The first and second catheters are configured for relative movement with respect to each other, and can be arranged coaxially with respect to each other, or in parallel to each other. The first and second catheters are configured for relative movement with respect to each other from a first position in which the first and second fixation points are spaced apart from each other by a first distance D1 to a second position in which the first and second fixation points are spaced apart from each other by a second distance D2. The device is configured such that, when the first and second fixation points are separated from each other by the second distance D2, the proximal portion of the balloon is inverted with respect to the distal portion of the balloon to form a receptacle having an internal volume and rim. Preferably, the device is further configured such that, when the first and second fixation points are separated from each other by the first distance D1, the proximal portion of the balloon is not inverted with respect to the distal portion of the balloon.

The closed internal cavity is sealed such that fluid from outside the balloon cannot enter the cavity, except by way of a dedicated conduit configured to provide fluid (gas or air) to the interior of the balloon). The first and/or the second catheter can provide a conduit configured to provide fluid to the sealed internal cavity of the balloon.

The device can further comprise a locking mechanism, preferably a releasable locking mechanism, configured to lock the first catheter and second catheter in the second position with respect to each other. The locking mechanism can be provided proximate to the first and second fixation points (e.g. within the cavity), or it can be provided remote from the receptacle formed by the inverted balloon.

The locking mechanism can comprise a clamp fixed with respect to one of the first and second catheters, which is configured to grip the other of the first and second catheters.

For example, a locking mechanism can be formed integrally with the first and second fixation points. In such embodiments, the fixation point P2 can comprise a first locking component (e.g. a ring) about which a seal is formed between the proximal portion of the balloon and the first catheter. The first locking component can comprise a projection extending in a distal direction. The fixation point P1 can comprise a second locking component at which the second catheter is secured to the distal portion of the balloon. The second locking component can comprise a recess configured to receive the projection in the first locking component. The projection on the first locking component and the recess of the second locking component can comprise the male and female parts of a push-fit or snap-fit connector configured to secure the first and second catheters in the second position. An annular projection in the first component and an annular recess in the second component can provide snap-fit or push-fit of the first and second components regardless of the rotational orientation of the first and second fixation members. Alternative locking mechanisms such as bayonet and screw-threaded locking arrangements are also possible.

Preferably, a conduit is provided between the first catheter and the second catheter, wherein the conduit is provided in fluid communication with the internal cavity of the balloon.

The device can be configured such that the distal portion of the balloon is more rigid than the proximal portion of the balloon. The increased rigidity can be achieved by forming the distal portion of the balloon from a different material than the proximal portion or the balloon or by increasing its thickness.

In at least some embodiments of the present invention, one or more support structures are provided to hold the distal portion of the balloon in an open configuration. Preferably, the support structure(s) are collapsible to allow it to be advanced or introduced into the body through a natural lumen.

The support structure(s) can be disposed within the cavity of the balloon. It can comprise a concave structure, oriented with its convex side facing the distal portion of the balloon and its concave side facing the proximal portion of the balloon. For example, the support structure can comprise a cup, frame or cage that can support the distal portion of the balloon in an open configuration in which it cannot collapse in on itself.

In addition to or as an alternative to a support structure disposed within the cavity, a support structure can be attached or affixed to the distal portion of the balloon (on its outer side), or incorporated into the membrane of the balloon. In at least one example, the balloon can be formed by dip-coating a mesh support structure.

The support structure can comprise a resiliently deformable material, such as a shape-memory material, that can be deformed from an expanded configuration to a collapsed configuration to allow it to be inserted into the body through a natural lumen in a minimally invasive manner, before resuming its original expanded shape. Examples of suitable deformable materials include shape-memory alloys, such as nickel titanium alloys (e.g. nitinol) and elastically deformable polymers.

The balloon itself can take many different forms. For example, the balloon can comprise an elastic or inelastic membrane. It can comprise integrated reinforcement, e.g. being formed of a dip-coated support mesh. Its shape can also vary. For example, the balloon can be substantially spherical or ellipsoid. However, the balloon can also comprise a dumbbell shape having two generally spherical nodes joined by a cylindrical centre portion therebetween. In some applications, such a shape may be particularly advantageous because, once inverted, the central portion forms a constriction or neck at the open proximal end of the receptacle that further enhances the directional flow of the device.

The balloon can be formed of a continuous membrane, or it can comprise multiple membrane segments joined together to provide the sealed cavity. For example, the proximal portion of the balloon can be formed of a first membrane segment and the distal portion of the balloon can be formed of a second membrane segment.

In some embodiments of the invention, it will be appreciated that the first and/or second catheters can be replaced by guidewires. For example, the first catheter can be provided in fluid communication with the cavity of the balloon and the second catheter can be replaced by a guide wire. Alternatively, both the first and second catheters can be replaced by guide wires running parallel to each other.

Moreover, the first and second catheters can be accompanied by a guide wire along which the device can be advanced into position.

In a second aspect of the invention, there is provided a (deployed) device for circulatory assistance comprising a dual-walled concave receptacle formed of a partially inverted balloon, in which an outer wall of the receptacle is formed by a first portion of a balloon and an inner wall of the receptacle is formed by an inverted portion.

Preferably, the dual-walled receptacle comprises a (concave) receptacle having an internal volume, the receptacle extending from a rim that defines an open proximal end, to a closed distal end. The receptacle comprises an inner wall portion and an outer wall portion, the inner wall portion and the outer wall portion being connected to each other at the rim to form a cavity between the inner and outer wall portions (from the rim to the closed distal end). At least a portion of the inner wall portion is configured for movement with respect to the outer wall portion, such that the internal volume of the cavity between the inner and outer walls increases. Since the receptacle is concave to provide an internal volume, and since the inner wall is configured for movement with respect to the outer wall portion, increasing the internal volume of the cavity decreases the available internal volume of the receptacle, thereby serving to eject fluid from the internal volume of the receptacle.

Preferably, the outer wall portion is more rigid than the inner wall portion. The increased rigidity can be provided by the material choices of the wall portion (e.g. material with higher stiffness, or material with increased thickness) or by the additional a-support structure.

The device can comprise one or more support structures configured to hold the outer wall portion in an open configuration. The support structures can be provided within the cavity of the balloon. It can comprise a concave structure, oriented with its convex side facing the distal portion of the balloon and its concave side facing the proximal portion of the balloon. For example, the support structure can comprise a cup, frame, or cage that can support the distal portion of the balloon in an open configuration in which it cannot collapse in on itself.

In addition to or as an alternative to a support structure disposed within the cavity, a support structure can be attached or affixed to the distal portion of the balloon (on its outer side), or incorporated into the membrane of the balloon. In at least one example, the balloon can be formed by dip-coating a mesh support structure.

The support structure can comprise a resiliently deformable material, such as a shape-memory material, that can be deformed from an expanded configuration to a collapsed configuration to allow it to be inserted into the body through a natural lumen in a minimally invasive manner, before resuming its original expanded shape. Examples of suitable deformable materials include shape-memory alloys, such as nickel titanium alloys (e.g. nitinol) and elastically deformable polymers.

The device can further comprise a first catheter fixed to an outer wall portion of the receptacle at a first fixation point P1. A second catheter can be fixed to the inner wall portion at a second fixation point P2.

The device can further comprise an actuation system configured to move the inner wall portion back and forth with respect to the outer wall portion to provide a pumping action by alternately increasing and decreasing the available internal volume of the receptacle.

The actuation system can comprise a pneumatic actuation system comprising a fluid delivery system configured to inflate the cavity between the between the inner and outer walls by delivering a fluid to the cavity though one of the first and second catheters. Alternatively, the actuation system can comprise a mechanical actuation system in which the first and second catheters are moved with respect to each other to alternately increase and decrease a distance between the first and second fixation points.

In at least one example, the second catheter is in fluid communication with the internal cavity between the first and second wall portions and is configured to deliver an inflating fluid thereto. In such examples, the first and second catheters can be configured for movement with respect to each other such that the distance between the first and second fixation points can alternately increase and decrease. Alternatively, the first and second catheters can be fixed with respect to each other, such that the internal cavity is inflated towards the central axis as the cavity is filled with inflating fluid (gas or liquid).

In embodiments in which the first and second catheters are fixed with respect to each other, the device can further comprise a locking mechanism, preferably a releasable locking mechanism that fixes the first fixation point with respect to the second fixation point.

The locking mechanism can be provided proximate to the first and second fixation points (e.g. within the cavity), or it can be provided remote from the receptacle formed by the inverted balloon.

The locking mechanism can comprise a clamp fixed with respect to one of the first and second catheters, which is configured to grip the other of the first and second catheters.

Alternatively, the locking mechanism can be formed integrally with the first and second fixation points. For example, a locking mechanism can be formed integrally with the first and second fixation points. In such embodiments, the fixation point P2 can comprise a first locking component (e.g. a ring) about which a seal is formed between the proximal portion of the balloon and the first catheter. The first locking component can comprise a projection extending in a distal direction. The fixation point P1 can comprise a second locking component at which the second catheter is secured to the distal portion of the balloon. The second locking component can comprise a recess configured to receive the projection in the first locking component. The projection on the first locking component and the recess of the second locking component can comprise the male and female parts of a push-fit or snap-fit connector configured to secure the first and second catheters in the second position. An annular projection in the first component and an annular recess in the second component can provide snap-fit or push-fit of the first and second components regardless of the rotational orientation of the first and second fixation members. Alternative locking mechanisms such as bayonet and screw-threaded locking arrangements are also possible.

In a third aspect of the invention, there is provided a method for deploying a heart support device comprising inverting a balloon as described with reference to the first aspect of the invention to form a receptacle as described with reference to the second aspect of the invention.

For each of the above-described inventive aspects, the first and second catheters can extend in a generally proximal direction from the first and second fixation points. In this example, the first catheter (which is affixed to the distal end of the balloon or outer wall portion) generally extends through an internal lumen of the second catheter (which is affixed to the proximal end of the balloon or inner wall portion).

However, in a second group of embodiments, the first and second catheters can extend in a generally distal direction from the first and second fixation points. In these embodiments, the second catheter (which is affixed to the proximal end of the balloon or inner wall portion) extends through an inner lumen of the first catheter (which is affixed to the distal end of the balloon or outer wall portion).

BRIEF DESCRIPTION OF THE DRAWINGS

The present invention will now be described with reference to a number of exemplary embodiments shown in the following drawings.

DETAILED DESCRIPTION OF THE DRAWINGS

Figure 1:
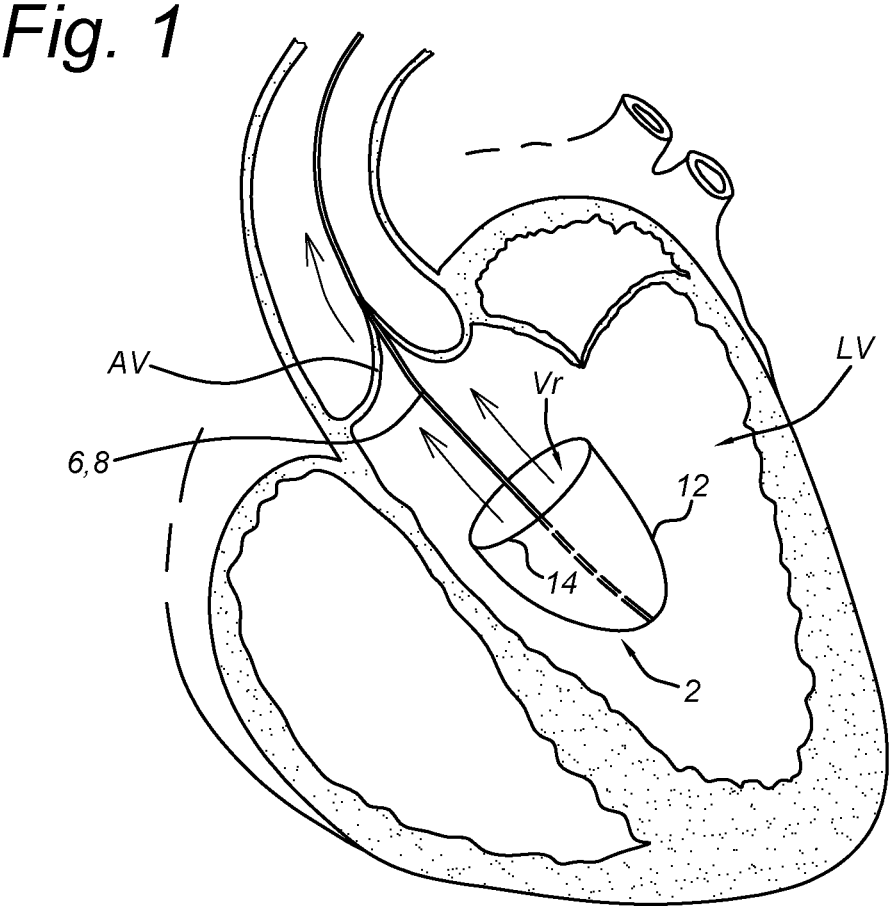
FIG. 1 shows a heart assist device according to the present invention disposed within a heart chamber.

FIG. 1 shows an exemplary embodiment of a heart support device 2 for providing circulatory assistance. The heart support device 2 shown in FIG. 1 is configured to sit with a chamber of the heart (in the illustrated example, the left ventricle LV) and is configured to pump blood toward the aortic valve AV. The device 2 is advantageously mounted or connected to at least one catheter 6, 8 with which the device 2 is delivered and deployed. The device generally comprises a balloon having a distal portion, which is held in an open configuration (once deployed) and a proximal portion that is inverted with respect to the distal portion to form a concave, dual-walled receptacle 12 defining an internal volume Vr and a rim 14. To displace blood from within the receptacle 12, an interior volume of the cavity formed by the dual-walled construction is alternately increased and decreased. As the internal volume of the cavity is increased, the available volume within the concave dual-walled receptacle decreases, thus displacing blood through the open proximal end of the cavity, towards the aortic valve.

As used herein, the term "proximal" refers to the open end of the receptacle through which blood is displaced, and does not imply any particular orientation of the device with respect to the patient or the surgeon tasked with placement of the device. Moreover, although embodiments of the present invention are described herein with reference to a device adapted for placement in the left ventricle LV, the skilled person will appreciate that the present invention may also be implemented in devices adapted for placement in other heart chambers (e.g. the right ventricle), or for placement outside the heart (e.g. in the aorta). Embodiments of the present invention can be adapted and optimised for placement in different heart chambers and associated lumens by modifying the configuration and extension direction of any control and placement catheters, as will become apparent from the detailed description below.

Heart assist devices according to the present invention may provide a simple and effective way of providing an intra-lumen (intra-cardiac or intra-vascular) circulatory assist device, with a simple mechanical mode of deployment and actuation. These advantages, and further benefits provided by the present invention, will be apparent from the exemplary embodiments of the invention, which will now be described in more detail with reference to FIGS. 2-6.

Figure 2A:
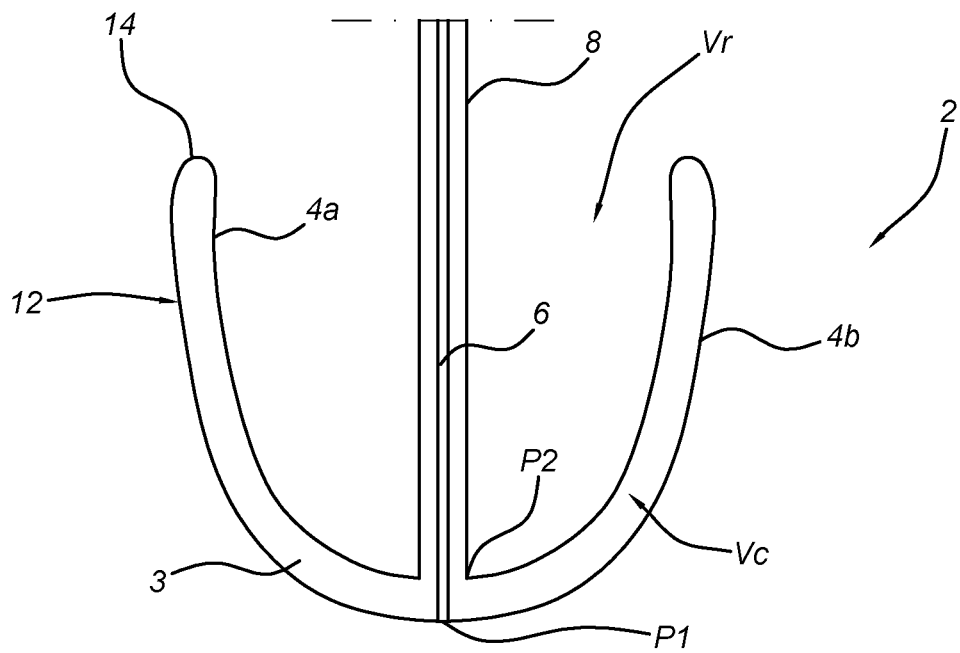
FIGS. 2A-2B show a cross-sectional view of the device of FIG. 1 during use, with the plane of the cross-section parallel to the long axis of the device.
Figure 2B:
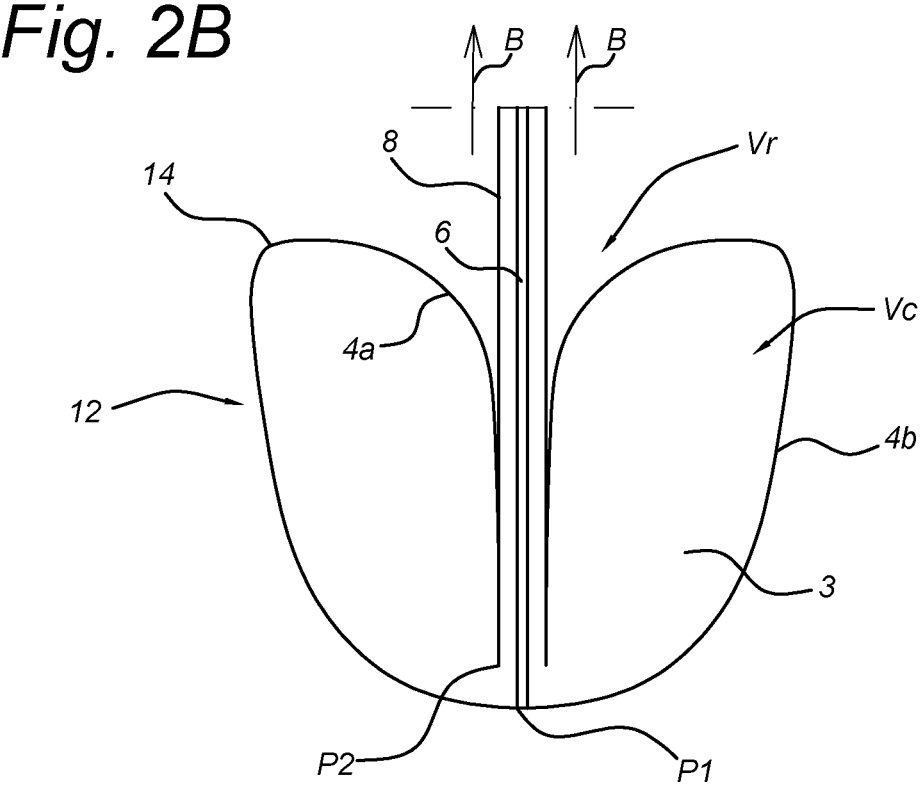

FIGS. 2A and 2B show cross-sectional views of a heart assist device according to the present invention. FIG. 2A shows the device in a first configuration with the volume of the internal cavity between the two walls of the receptacle is at a minimum (e.g. when the available volume of the concave receptacle is at its largest and contains a maximum volume of blood). FIG. 2B shows the device in a second configuration in which the internal volume between the two walls of the chamber is at a maximum (e.g. when the available volume of the concave receptacle is at its smallest—possibly zero).

Turning first to FIG. 2A, the heart assist device 2 comprises a concave receptacle 12 defining an internal volume Vr. The receptacle 12 extends from an open proximal end, which is bounded by a proximal rim 14, to a closed distal end. As shown in FIG. 2A, the receptacle 12 can take the form of a cup. The internal volume Vr of the receptacle 12 is in fluid communication with a volume external to the receptacle. That is, the internal volume Vr of the receptacle can be filled with fluid from the environment in which it is placed, i.e. blood within a chamber of the heart.

The receptacle 12 comprises an inner wall portion 4a and an outer wall portion 4b, with the inner wall portion 4a and the outer wall portion 4b being joined to each other at the rim 14. The join between the inner wall portion 4a and the outer wall portion 4b is the point at which the inner wall portion 4a and the outer wall portion 4b meet to form the rim 14. A join between two distinct or separate components is not required, although it may be present in some embodiments. Between the outer wall portion 4a and the inner wall portion 4b, a closed cavity 3 is formed, which has an internal volume Vc.

The inner wall portion 4a and the outer wall portion 4b together form a balloon (described in more detail with reference to FIGS. 5A-5C), in which the inner wall portion 4a of the balloon has been inverted with respect to the outer wall portion 4b.

The outer wall portion 4b is supported in an open configuration to form the receptacle 12. The outer wall portion 4b can be supported in the open configuration in a number of ways. For example, the outer wall portion 4b can be formed of material that is biased into a self-supporting open configuration. The outer wall portion can also comprise an integrated support structure, e.g. a frame or a plurality of ribs forming part of or affixed to the outer wall portion 4b. Alternatively, a separate support structure can be provided, for example within the cavity between the inner and outer wall portions, as will be described in more detail below.

In the embodiment shown in FIGS. 2A and 2B, the outer wall portion 4b is self-supporting in the open configuration and is more rigid than the inner wall portion 4a. The outer wall portion 4b can be made more rigid than the inner wall portion 4a in a number of ways. It may be formed of the same material as the inner wall portion 4a, but have an increased thickness. It can be reinforced by dip-coating or by providing an additional support structure such as a mesh or scaffold attached to or integrated with the material of the outer wall portion 4b. The outer wall portion 4b may also be formed of a different material to the inner wall portion 4a, with a join formed therebetween. Preferably, the outer wall portion comprises nylon, polyurethane, polyether block amides (Pebax), polyethylene terephthalate (PET) or similar materials. Other suitable materials will also be apparent to the person skilled in the art.

Referring now to FIG. 2B, at least a portion of the inner wall portion 4b is configured for movement with respect to the outer wall portion 4b to increase the internal volume Vc of the cavity 3. As shown in FIG. 2B, as the internal volume Vc of the cavity 3 increases, the available volume Vr within the receptacle 12 decreases, and blood if forced in the direction of arrows B from the receptacle, through the proximal opening bounded by the rim 14. In the embodiment shown in FIG. 1, the device 2 is oriented with the proximal opening directed towards the aortic valve. Therefore, as the inner wall 4a expands into the internal volume Vr of the receptacle 12, blood B is displaced from the interior volume Vr of the receptacle 12 toward the aortic valve AV to assist the pumping action of the heart.

As shown in FIGS. 2A and 2B, because the inner wall portion 4a expands inwardly away from the outer wall portion 4b that forms the wall of the receptacle, an impulse is generated that directs the flow of blood towards the aorta. This arrangement is advantageous over many conventional displacement pumps, which rely on an expanding balloon to displace a volume of blood without controlling the direction of displacement.

The internal volume Vc of the cavity 3 can be varied in different ways and different actuation arrangements can be provided. For example, in the embodiment shown in FIGS. 2A and 2B, the internal volume Vc of the cavity 3 is increased by inflating the cavity Vc with a fluid (e.g. a liquid or gas).

In the embodiment shown in FIGS. 2A and 2B, a first catheter 6 extends through the inner wall portion 4a and attaches at a first fixation point P1 to the outer wall portion 4b. The first catheter 6 can be configured to maintain the position of the receptacle 12 within the heart, since the outer wall portion 4b does not deform after deployment within the heart chamber.

As illustrated, a second catheter 8 defining an internal lumen can be provided and configured to deliver an inflation fluid to the cavity 3. The inflation fluid can be gas or liquid, and can comprise one or more of e.g. helium, carbon dioxide, nitrogen, air and saline. As the inflation fluid fills the cavity 3, the inner wall portion 4a expands into the internal volume Vr of the receptacle 12. The second catheter 8 is fixed at a second fixation point P2 to the inner wall portion 4b. The first catheter 6 extends through the inner lumen of the second catheter 8.

Figure 3:
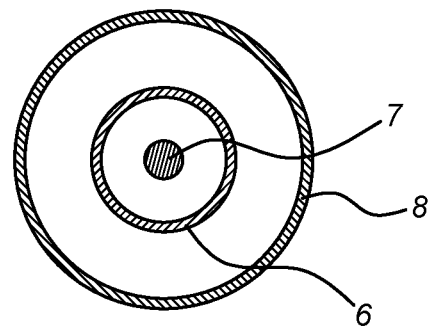
FIG. 3 shows a cross-sectional view of the catheter shown in FIGS. 2A-2B, with the plane of the cross-section orthogonal to the long axis of the device.

The inner lumen of the second catheter 8 is in fluid communication with the internal volume Vc of the cavity 3 via one or more openings. One or more openings may be provided at an open distal end of the second catheter 8 and/or one or more openings may be provided along the outer walls of the tube that forms the catheter body (at a location that provides fluid communication with the internal volume Vc of the cavity 3). In addition to the first and second catheters 6, 8, a guide wire can be provided to aid in placement and deployment of the device 2. FIG. 3 shows an exemplary configuration comprising an outer catheter 8 defining an internal lumen for delivering inflation fluid to the cavity 3. The inner catheter 6 extends along the internal lumen, and defines its own internal lumen along which a guide wire 7 extends. The device can thus be advanced along guide wire 7 for positioning in the heart. It will be appreciated that the precise coaxial arrangement shown in FIG. 3 is not required in all embodiments of the invention. Moreover, if a guidewire is not required to place the device, the inner lumen of the first catheter 6 is not required and the inner catheter can be replaced with a wire.

In the embodiment shown in FIGS. 2A and 2B, when the device 2 is in the deployed configuration, the first fixation point P1 and the second fixation point P2 are fixed relative to each other. That is, the inner and outer catheters 6, 8 are not movable with respect to each other once the device has been deployed (although relative movement between the first and second catheters may be advantageous before deployment, as described in more detail with reference to FIGS. 5A-6C below). The position of the first and second fixation points P1 and P2 can advantageously be locked with respect to each other with a locking mechanism, and preferably a releasable locking mechanism. Such a locking mechanism (not shown) can be provided directly between the first and second fixation points P1, P2, within the receptacle 12, or it can be provided remotely by locking the first and second catheters 6, 8 relative to each other.

Although not shown in the drawings, a suitable locking mechanism can comprise a push-fit or snap-fit assembly within the cavity 3. For example, a locking mechanism can be formed integrally with the first and second fixation points. In such embodiments, the fixation point P2 can comprise a first locking component (e.g. a ring) about which a seal is formed between the proximal portion of the balloon and the first catheter. The first locking component can comprise a projection extending in a distal direction. The fixation point P1 can comprise a second locking component at which the second catheter is secured to the distal portion of the balloon. The second locking component can comprise a recess configured to receive the projection in the first locking component. The projection on the first locking component and the recess of the second locking component can comprise the male and female parts of a push-fit or snap-fit connector configured to secure the first and second catheters in the second position. An annular projection in the first component and an annular recess in the second component can provide snap-fit or push-fit of the first and second components regardless of the rotational orientation of the first and second fixation members. Alternative locking mechanisms such as bayonet and screw-threaded locking arrangements are also possible. A remote releasable locking mechanism for locking the first catheter with respect to the second catheter is described in more detail with reference to FIGS. 5A-5C.

With the first and second fixation points P1 and P2 fixed with respect to each other, in the embodiment shown in FIGS. 2A and 2B, the expansion of the internal volume Ve of the cavity is due to inflation of the cavity 3 with an inflating fluid. To this end, the inner wall portion 4a is configured to expand into the interior volume Ve of the cavity. The inner wall portion 4a can be elastic, or it can be inelastic but provided with enough slack (with the outer wall portion 4b is supported in the open position after deployment) to be inflated by the inflation fluid. The inner wall portion may comprise nylon, polyurethane, polyether block amides (Pebax), polyethylene terephthalate (PET) or similar materials. Other suitable materials will also be apparent to the person skilled in the art. In preferred embodiments of the invention an elastic or at least semi-compliant membrane forms (at least part of) the inner wall portion 4a. Although an inelastic material can be used to provide suitable pumping, in at least some embodiments an elastic or semi-compliant material is preferred because a (relatively) smooth surface can be maintained within the receptacle, when the inner wall portion 4b is in the retracted position and the advanced position. The smooth surface that can be provided with an elastic membrane eliminates many of the creases that are formed in embodiments comprising a (slack) inelastic membrane, which may in turn reduce the formation of cavities in which thrombosis may occur, especially in high-risk groups. In any event, to ensure that the inflating fluid delivered to the cavity Vc does not enter the circulatory system of the user, the membrane that forms the inner wall portion 4a should be form a fluid-impermeable enclosure with the outer wall portion 4b to ensure that the cavity Vc is sealed from the internal volume of the heart.

Figure 4A:
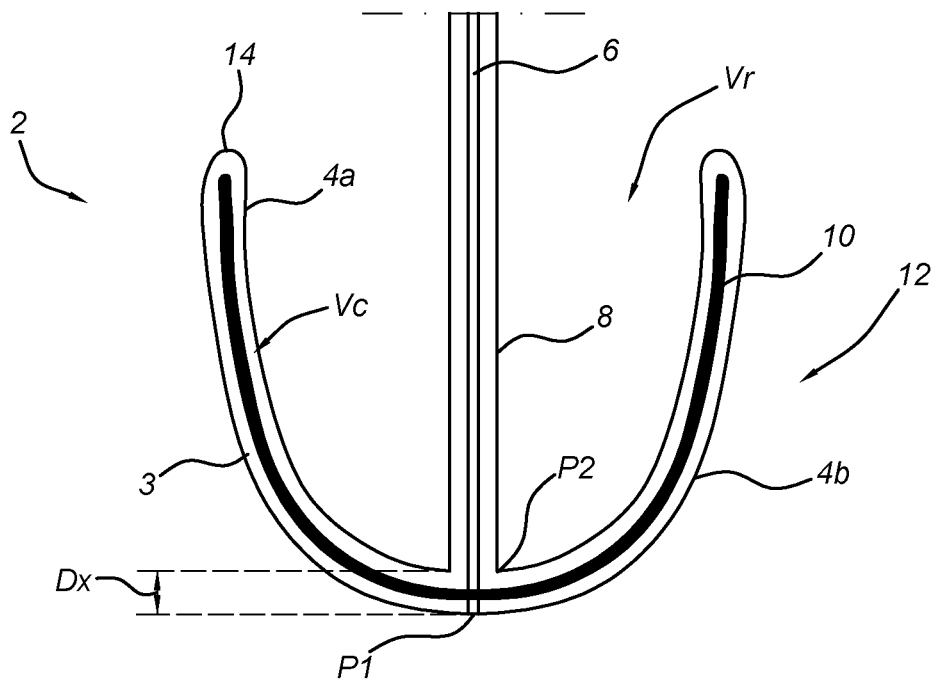
FIGS. 4A-4B show a cross-sectional view of an alternative embodiment of the invention during use.
Figure 4B:
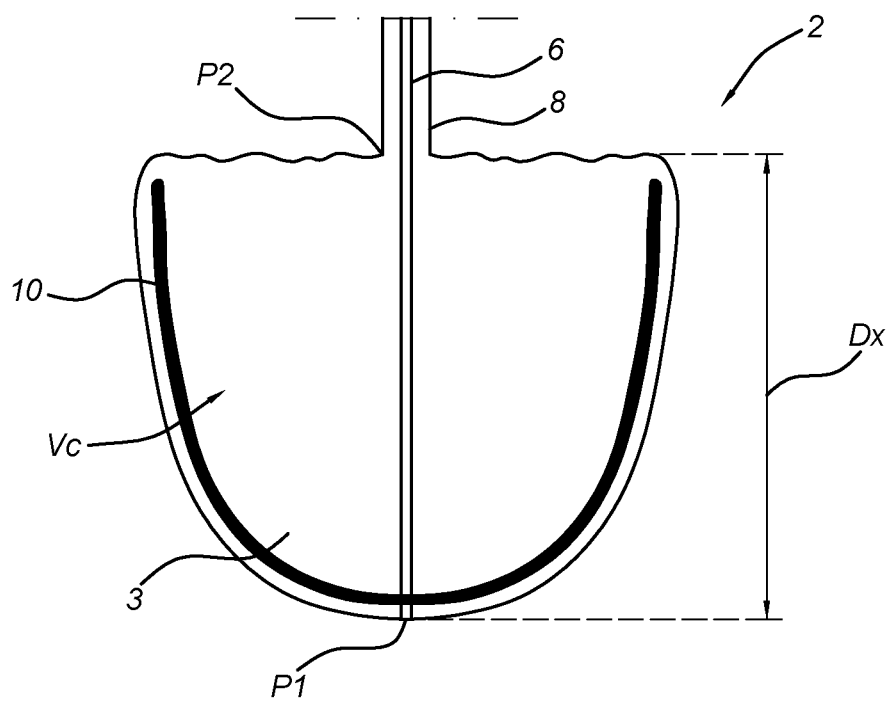

Turning now to FIGS. 4A and 4B, in at least some embodiments of the invention, an alternative actuation system can be employed in which a distance Dx between the first and second fixation points P1 and P2 can be varied to alternately move the inner wall portion 4a towards and away from the outer wall portion 4b, thereby varying the internal volume Vc of the cavity 3. As described above, this in turn varies the available volume Vr of the receptacle 12 to pump blood through the open proximal end of the receptacle.

As shown in FIG. 4A, the heart support device 2 comprises a receptacle 12 that is generally similar to the receptacle 12 described with reference to FIG. 2A, and has an inner wall portion 4a and an outer wall portion 4b, joined to each other at a rim 14 to define a concave, dual-walled receptacle 12 having an internal volume Vr. A first catheter 6 is fixed at a first fixation point P1 to the outer wall portion 4b and a second catheter 8 is fixed at a second fixation point P2 to the inner wall portion 4a. Like the embodiment described with reference to FIG. 2A, the first catheter 6 can be accompanied by or replaced with a wire 7.

Unlike the embodiment shown in FIGS. 2A and 2B, the first and second fixation points P1 and P2 are not fixed relative to each other when the device is in the deployed configuration, and as such the first catheter 6 is axially movable with respect to the second catheter 8.

As shown in FIG. 4B, as the first catheter 6 moves with respect to the second catheter 8, the distance between the first and second fixation points P1 and P2 increases. As the distance increases, the inner wall portion 4a is moved away from the outer wall portion 4b, thereby increasing the internal volume Vc of the cavity 3 between the inner and outer wall portions 4a, 4b. As described above, increasing the volume Vc of the internal cavity between the wall portions 4a, 4b decreases the available volume Vr of the receptacle 12, and expels blood contained within the receptacle 12 out of the open proximal end and towards the aortic valve. Because the inner wall portion 4a expands into the receptacle volume Vr away from the outer wall portion 4b, an impulse is created that expels blood through in the opening surrounded by rim 14 in a directional manner, e.g. towards the aortic valve in deployed arrangement shown in FIG. 1. This may improve the efficiency of the device and more closely approximate the natural function of the heart.

In at least some embodiments, the reciprocating catheter arrangement shown in FIGS. 4A and 4B can be combined with a catheter lumen configured to deliver inflating fluid to the internal volume Vc of the cavity 3. The inflation fluid can be configured to maintain a minimum pressure within the cavity 3 to expel blood from the receptacle 12 or it can be used to drive reciprocal movement of the catheter. Alternatively, the distance Dx between the first and second fixation points P1, P2 can be pushing and/or pulling one of the first and second catheters with respect to the other.

Instead of integrated support means to hold the outer wall 4b in an open configuration, the embodiment shown in FIG. 4A comprises a separate support structure 10 disposed within the inner cavity 3 between the inner and outer walls 4a, 4b. Although the support structure 10 is described with reference to the exemplary embodiment illustrated in FIG. 4A, the skilled person will appreciate that the support structure 10 can be employed in the embodiment shown in FIGS. 2A and 2B, in addition to or as an alternative to a more rigid outer wall portion 4b. The support structure 10 can comprise a cup, frame, support ribs or any other structure that holds the outer wall portion 4b in an open configuration when deployed in a heart chamber. The support structure 10 can also be omitted from the embodiment shown in FIGS. 4A and 4B, and replaced with a more rigid outer wall portion 4b or an integrated support structure (as described with reference to FIGS. 2A and 2B).

To ensure that the device 2 can be inserted into a suitable lumen in a minimally invasive manner (e.g. percutaneously), the outer wall portion 4b (and the optional additional support structure(s)) is preferably collapsible from its open configuration to a collapsed configuration to allow the device 2 to be advanced into the left ventricle LV through the aorta (alternative positions and placement routes are also possible). The outer wall portion 4b is thus preferably supported in the open or expanded configuration by a resiliently deformable material that can be deformed from an open configuration temporarily for insertion, but will revert to its original, open configuration when in place. Suitable resiliently deformable materials are known in the art and include elastically deformable polymers and e.g. shape memory materials such as shape memory alloys (e.g. nitinol) and shape memory polymers. Other collapsible support structures can also be provided to hold the outer wall portion 4b in the open configuration after deployment (e.g. inflatable ribs).

As discussed above, the device 2 is preferably formed or deployed by inverting a balloon 4 to form the inner and outer wall portions 4a, 4b. Inversion of the balloon 4 will now be described in more detail with reference to FIGS. 5A to 5C.

Figure 5A:
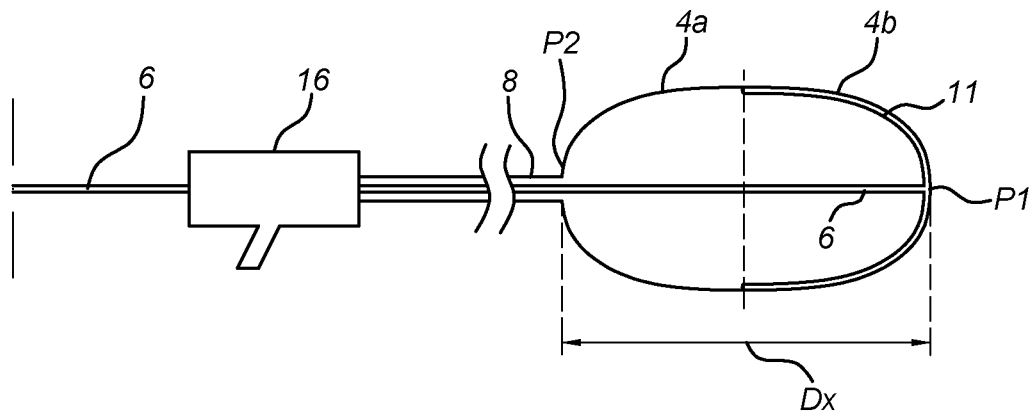
FIGS. 5A-5C show a cross-sectional view of a device according to an embodiment of the invention, before, during, and after deployment.

As shown in FIG. 5A, before deployment into the working configurations shown in FIGS. 2A-2B and 4A-4B, the device 2 comprises a balloon 4 defining a closed internal volume Vc. The balloon 4 extends from a proximal end to a distal end and comprises a proximal portion 4a and a distal portion 4b. A longitudinal axis A extends between the proximal end and the distal end. A first catheter 6 (or a guide wire) is affixed to a distal end of the balloon at a first fixation point P1. A second catheter 8 is fixed to the proximal end of the balloon 4 at a second fixation point P2 and comprises an internal lumen through which the first catheter 6 extends. In the embodiment shown in FIGS. 5A-5C, the distal portion 4b of the balloon 4 is supported in an open configuration by integrated support ribs 11. However, this arrangement can be exchanged for or supplemented by the reinforced or supported outer wall portions 4b described above with reference to FIGS. 2A-2B and 4A-4B.

Figure 5B:
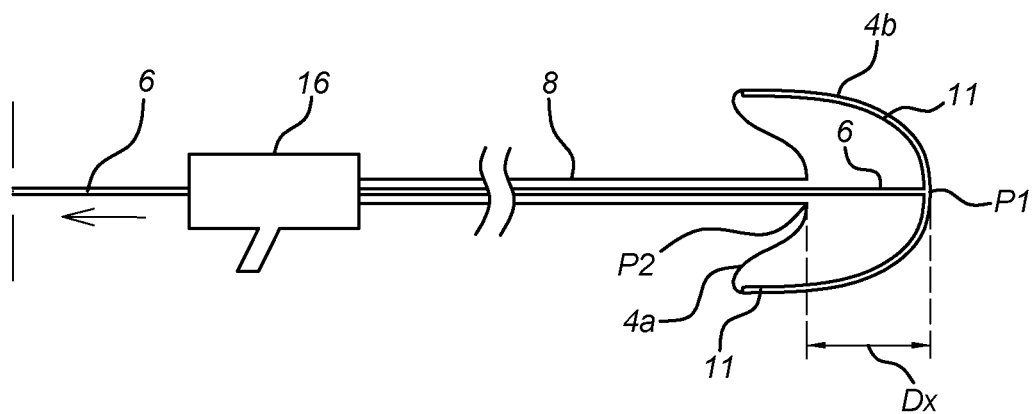
Figure 5C:
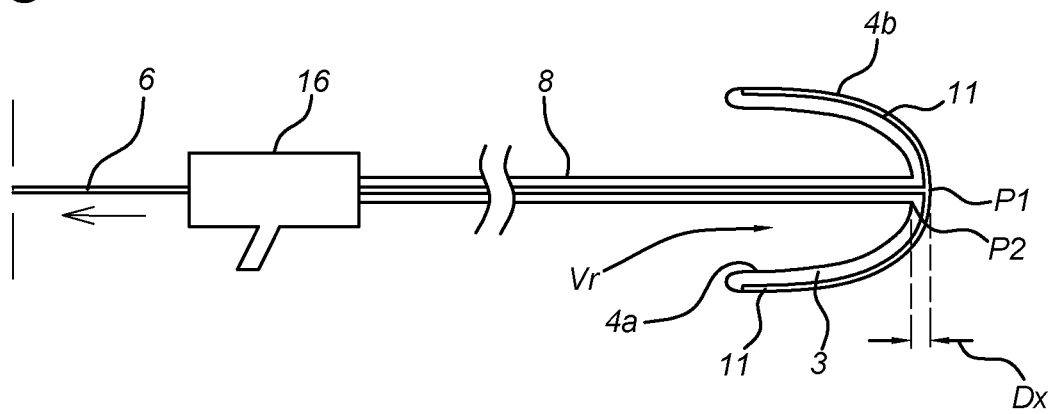

Turning now to FIG. 5B, the second catheter 8 is slidably mounted with respect to the first catheter 6. As the second catheter 8 is slid distally with respect to the first catheter 6, the first fixation point P1 brought towards the second fixation point P2 and the distance Dx decreases. Since the distal portion 4b of the balloon is supported in an open configuration, as the first and second fixation points P1 and P2 approach each other, the proximal portion 4a of the balloon 4 begins to invert with respect to the distal portion 4b. As shown in FIG. 5C, with the first and second fixation points P1, P2 brought into close proximity, and with the distance Dx at its minimum value, the proximal portion 4a of the balloon 4 is fully inverted with respect to the distal portion 4b of the balloon 4 to form the dual-walled receptacle 12 described above with reference to FIGS. 2-4.

An example of a remote locking mechanism 16 that can lock the first and second fixation points P1, P2 in the position shown in the fully deployed position is also illustrated in FIGS. 5A-5C.

As shown in FIGS. 5A-5C, the first catheter 6 extends through the inner lumen of the second catheter 8 until it reaches a port 16 comprising an internal bore. At port 16, the second catheter 8 stops, and the first catheter extends through the port 16. The port 16 is switchable between a first configuration in which the first catheter 6 can move freely through the internal bore of the port, and a second configuration in which the catheter 6 is axially restrained from movement with respect to the port 16. As an example, the port 16 can thus comprise a selectively variable constriction that can be reduced from a first diameter at which the catheter 6 can slide freely through the constriction, to a smaller second diameter, that grips the catheter 6 and prevents axial movement thereof through the internal bore or the port 16. Alternative clamping arrangements can also be implemented, for example a screw clamp, or a parallelogram clamp.

In embodiments comprising an actuation system in which the distance Dx between the first and second fixation points P1 and P2 is varied (as described with reference to FIGS. 4A and 4B), movement of the first and second catheters 6, 8 relative to each other is permitted. However, advantageously, a blocking structure can be provided to prevent the distance Dx between P1 and P2 extending beyond predetermined set maximum distance (e.g. the distance Dx shown in FIG. 5A or 5B). Similar to the locking mechanism, the blocking arrangement can directly engage the first and or second fixation points or it can be provided remotely. By providing a predetermined maximum distance between the first and second fixation points P1 and P2, the stroke distance of the actuation system (and thus the stroke volume of the device) can be controlled.

In the embodiments described above, the device 2 is arranged such that the catheter(s) 6, 8 and optional guide wire(s) 7 extend in a proximal direction from the distal end of the device, through the internal volume Vr or the receptacle 12 and through the proximal opening (in the direction of the aorta, as shown in FIG. 1). In this configuration, the first catheter 6 passes through the inner wall portion 4a to the outer wall portion 4b and extends along the inner lumen of the outer catheter.

However, the skilled person will appreciate that the device 2 can also be configured with the catheter(s) 6, 8 (and optional guide wire(s) 7) extending in a distal direction, i.e. starting at the distal end of the device and extending away from the proximal opening. Such an embodiment is shown in FIGS. 6A-6C.

Figure 6A:
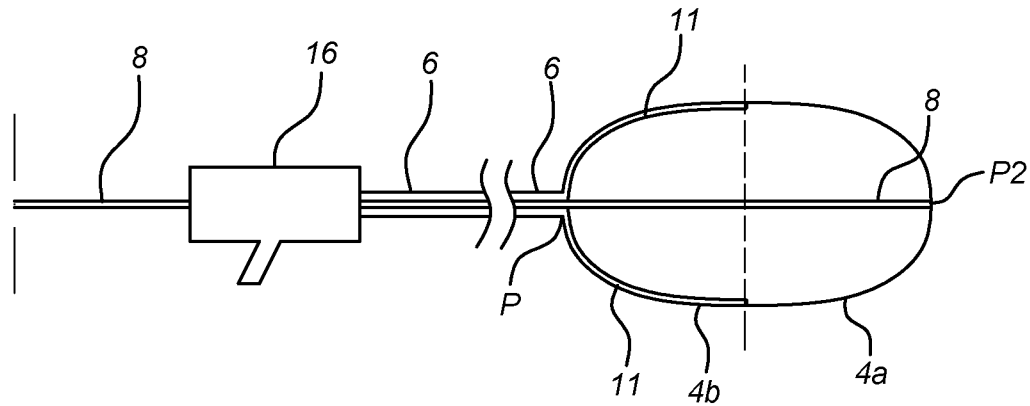
FIGS. 6A-6C show a cross-sectional view of a device according to another embodiment of the invention, before, during, and after deployment.
Figure 6B:
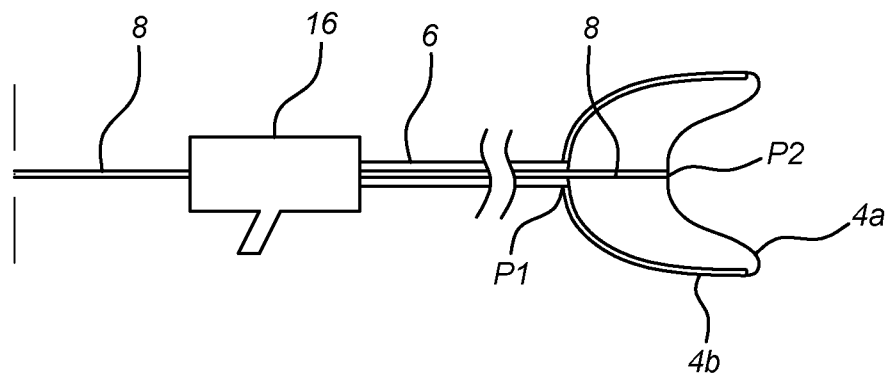
Figure 6C:
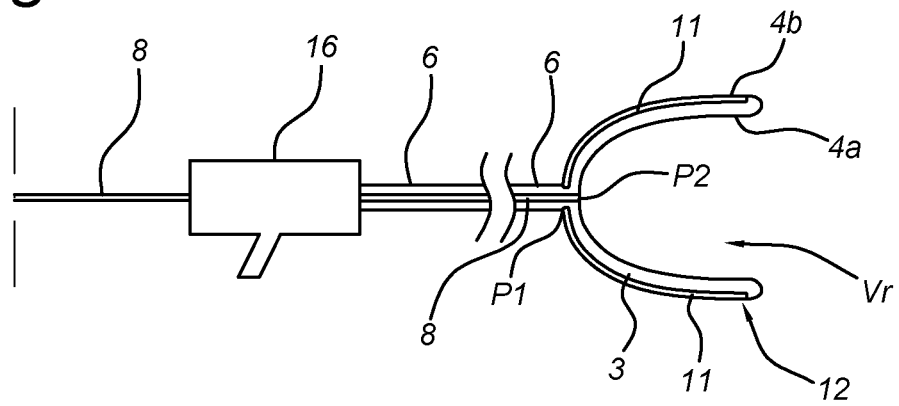

As shown in FIG. 6A, in some embodiments, the device can be arranged with the first catheter 6 attached to the distal wall portion 4b of the balloon 4 and defining the central lumen through which inflating fluid can be delivered to the interior volume Vc of the cavity 3. The second catheter 8 (which may be accompanied by or replaced with a guide wire 7) extends through the central lumen of the first catheter 6 and is affixed to the proximal portion 4a of the balloon 4 at the second fixation point P2. As shown in FIGS. 6B and 6C, the balloon 4 can be inverted and controlled in a similar manner to the embodiment described above with reference to FIGS. 2-4, except that in the embodiment shown in FIGS. 6A-6C, the second catheter 8 must be moved distally relative to the second catheter in order to invert the balloon.

The present invention also comprises a method of deploying a heart assist device from an initial configuration to a working configuration, as illustrated in FIGS. 5A-5C and FIG. 6A-6C. Generally speaking, the method according to the invention comprises the steps of: providing a balloon 4 comprising a proximal portion 4a and a distal portion 4b; supporting the distal portion of the balloon 4 in an open configuration, and inverting the proximal portion of the balloon relative to the distal portion of the balloon. The inversion of the balloon 4 can be carried out using a first catheter 6 fixed to the distal wall portion 4b at a first fixation point P1 and a second catheter 8 fixed to the proximal wall portion 4a at a second fixation point P2, and by decreasing a distance Dx between the first and second fixation points P1 and P2 to invert the proximal wall 4a portion relative to the distal wall portion 4b to form a receptacle 12 having an internal volume Vr.

It will be appreciated that the method has been described with reference to a number of non-limiting exemplary embodiments and modifications can be made to the above-described embodiments without departing from the scope of the invention. Moreover, features from the above-described embodiments can be combined with other embodiments described herein. For example, the support structures for the outer wall described herein are applicable to all embodiments. Moreover, the actuation arrangements, locking mechanisms and blocking structures, can be combined individually with other embodiments.

The invention claimed is:

1. A heart support device for circulatory assistance, the heart support device comprising:
a catheter or guidewire;
a receptacle having an internal volume, the receptacle extending from a rim to a closed distal end, the rim defining an open proximal end,
wherein a proximal portion of the receptacle comprises an inner wall portion and a distal portion of the receptacle comprises an outer wall portion, the inner wall portion and the outer wall portion being connected to each other at the rim to form a closed cavity between the inner and outer wall portions, wherein the outer wall portion is more rigid than the inner wall portion,
wherein the catheter or guidewire extends through the inner wall portion, and
wherein at least a portion of the inner wall portion is configured for movement in a proximal direction with respect to the outer wall portion to transition from a concave configuration to a convex configuration; and
an actuation system configured to move the inner wall portion between the concave and convex configurations to displace a fluid from the receptacle.

2. The heart support device according to claim 1, further comprising a support structure to hold the outer wall portion in an open configuration.

3. The heart support device according to claim 2, wherein the support structure is disposed within the cavity defined between the inner and outer wall portions.

4. The heart support device according to claim 2, wherein the support structure comprises a shape-memory material.

5. The heart support device according to claim 1, wherein the catheter or guidewire is fixed to the outer wall portion at a first fixation point.

6. The heart support device according to claim 5, further comprising a second catheter fixed to the inner wall portion at a second fixation point.

7. The heart support device according to claim 6, wherein the second catheter is in fluid communication with an internal volume of the cavity.

8. The heart support device according to claim 6, wherein the catheter or guidewire is a first catheter or guidewire, and the first catheter or guidewire and the second catheter are slidably mounted with respect to each other.

9. The heart support device according to claim 6, wherein the catheter or guidewire is a first catheter or guidewire, and the first catheter or guidewire and the second catheter are configured to move with respect to each other in a reciprocating motion to alternately increase and decrease a distance between the first and second fixation points.

10. The heart support device according to claim 1, wherein the actuation system is configured to alternately increase and decrease an internal volume of the cavity, thereby alternately decreasing and increasing the internal volume of the receptacle.

11. The heart support device according to claim 10, wherein the actuation system comprises a delivery system for delivering fluid to and from the cavity between the inner and outer wall portions.

\* \* \* \* \*